United States Patent
Ono et al.

(10) Patent No.: US 7,532,769 B2
(45) Date of Patent: May 12, 2009

(54) IMAGE PROCESSING DEVICE, IMAGE PROCESSING METHOD AND IMAGE PROCESSING PROGRAM

(75) Inventors: Koichi Ono, Iwatsuki (JP); Toshimi Shinchi, Matsudo (JP); Tamotsu Sakuraba, Kawasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 753 days.

(21) Appl. No.: 10/941,097

(22) Filed: Sep. 15, 2004

(65) Prior Publication Data

US 2005/0280855 A1   Dec. 22, 2005

(30) Foreign Application Priority Data

Jun. 16, 2004   (JP)   ............... 2004-178425

(51) Int. Cl.
  *G06K 9/36* (2006.01)
(52) U.S. Cl. ............... 382/276; 358/1.1; 707/100
(58) Field of Classification Search ............... 382/276, 382/277, 307, 317, 100; 358/1.1–1.3; 707/100
  See application file for complete search history.

(56) References Cited

U.S. PATENT DOCUMENTS 6,791,707 B2 *   9/2004   Laverty et al. ............. 358/1.15

2004/0088378 A1 *   5/2004   Moats ..................... 709/219
2005/0216518 A1 *   9/2005   Hu et al. .................. 707/200
2005/0243358 A1 *   11/2005   Frings .................... 358/1.13

FOREIGN PATENT DOCUMENTS

| JP | 2000-099501 | 4/2000 |
| JP | 2002-044340 | 2/2002 |
| JP | 2002-297491 | 10/2002 |
| JP | 2004-054658 | 2/2004 |

OTHER PUBLICATIONS

Notification of Reasons for Refusal issued in a corresponding Japanese application, and translation thereof.
Notification of Reason for Rejection issued in corresponding Japanese Patent Application No. 2004-178425, and translation thereof.

* cited by examiner

*Primary Examiner*—Anand Bhatnagar
(74) *Attorney, Agent, or Firm*—Buchanan Ingersoll & Rooney PC

(57) ABSTRACT

The printer controller as an image processing device detects the information that indicates a limitation on an operation related to a PDF file from the file, and converts the PDF file into bitmap data. Furthermore, the printer controller sets up the operation limitation related to the bitmap data for the obtained bitmap data in accordance with the detected information.

19 Claims, 10 Drawing Sheets

FIG. 7

```
29
obj<</Filter/Adobe.PPKMS/Contents<308203e506092a864886f70d010702a08203d63082032d20201013
10b300906052b0e03021a05003023060092a864886f70d010701a0160414b7eec5109a5bc98fe68624788b7
— — — — — — — — — — — — — — — — — — — — — — — — — — — — — — — — — — 0
— — — — — — — — — — — — — — — — — — — — — — — — — — — — — — — — — — —
— — — — — — — — — — — — — — — — — — — — — — — — — — — — — — — — — — —
e3469f820ac7cce6d70fdf91ff13176e39dd0ab5e79e8db15fb93fefa617ee8c1e6f38ef8b6ba607ce181e088e3
5d60e186dc98d597946710b90478eeac5a0c8f29c261d455a07eb18188eab024f70cc3a9c075baa91eb6106
df4b3dbc221843c0327ac608f6d08f084e95500000000>/Type/Sig/Name(testname)/M(D:20040407133312
8+09'00')/ByteRange[0 2252 4264 7933 ]                                                    /Prop_Build<</Filter<</R
131097/Name/Adobe.PPKMS/V     1/Date(Nov     3     2003     14:27:40)>>/App<</R
393217/Name/Exchange-Pro/OS[/Win]/TrustedMode true)>>/PubSec<</R 131097/Date(Nov 3  2003
14:26:29)/NonEFontNoWarn          true>>>>/Reason(□□ 0S0ne      錯           nb          錯
-%·)/Reference[<<</Type/SigRef/TransformMethod/DocMDP/TransformParams<</Type/TransformPara
ms/P    2/V/1.2>>/Data          21     0          R/DigestLocation[4777          34     ]
/DigestMethod/MD5/DigestValue<a328b69db2a2ac5662996e60cc9da21a>>>]/SubFilter/adbe.pkcs7.sh
a1>>
endobj
```

FIG. 8

| Job No. | File Name | Status | Job Class | Owner | Date | ... | Print | Edit | Header |
|---|---|---|---|---|---|---|---|---|---|
| ... | ... | ... | ... | ... | ... | ... | ... | ... | ... |
| 123 | aaa.doc | Printed | Print | AAA | 20-Dec-03 | | Yes | Yes | Yes |
| 124 | bbb.xls | Printed | Print | AAA | 15-Jan-04 | | Yes | Yes | Yes |
| 125 | ccc.pdf | Printed | Print | BBB | 5-Mar-04 | ... | No | No | No |
| ... | ... | ... | ... | ... | ... | ... | ... | ... | ... |

FIG. 9

```
16 0 obj<</R 3/Length 128/Filter/Standard/O(U・t・/・・・S%[7Z1Jg?b¥(コトン1gI 稽・)/P -2364/U( K( K~へ贍＜
)/V 2>>
充@・hA 斾
endobj
```

IMAGE PROCESSING DEVICE, IMAGE PROCESSING METHOD AND IMAGE PROCESSING PROGRAM

This application is based on Japanese Patent Application No. 2004-178425 filed on Jun. 16, 2004, the contents of which are hereby incorporated by reference.

BACKGROUND OF THE INVENTION

1. Field of the Invention

The present invention relates to an image processing device, an image processing method, and an image processing program. The present invention relates more specifically to an image processing device, an image processing method, and an image processing program, which are used when obtaining bitmap data by converting data where security functions are set up.

2. Description of the Related Art

A technology has been established for setting up security functions that limit operations on document files in order to maintain confidentiality of the documents. For example, a PDF (Portable Document Format) file can be provided with a function to prevent a user from opening it unless the user enters a proper password or a function to clarify the author's identity.

As one of the technologies using such security functions, a file conversion device was proposed (see Unexamined Publication No. JP-A-2002-297491), which, upon receiving a request for printing the contents having an identifier specifying the output destination, e.g., a network address, converts the contents into a PDF file using said identifier as the password.

The file conversion device maintains the security of the document file to be printed while handling the transferred data until it reaches the printing device.

When a document file is transmitted to the printing device to be printed via a printer controller, said document file is converted into bitmap data, i.e., bitmapped image data by rasterization. The bitmap data thus obtained is printed on paper as well as saved in the printer controller.

However, since the operation limiting information that denotes the limitations of operations concerning said document file drops out during the process of rasterizing a document file in which security functions are set up, the process ends up storing the bitmap data having no security function set up in the printer controller.

Therefore, the saved bitmap data allows any person to view, print and modify it through applications such as Job Spooler Utility, etc. This is a problem as it allows a free use of the bitmap data which has the identical contents as those of the document file in which security functions are set up, essentially resulting in a loss of security for the document file.

SUMMARY OF THE INVENTION

It is an object of the present invention to provide an image processing device, an image processing method, and an image processing program, which are improved for solving the abovementioned problems.

A more detailed object of the present invention is to provide an image processing device, an image processing method, and an image processing program, that are capable of preventing data security from being destroyed while converting the data, in which security functions are set up, in order to obtain bitmap data.

According to an aspect of the invention, there is provided an image processing device, comprising: a detection unit for detecting information that indicates a limitation on an operation related to data of a specified file format from the data of the specified file format; a converting unit for converting the data of the specified file format into bitmap data; and a setup unit for setting up an operation limitation related to said bitmap data for said bitmap data in accordance with said information.

The present invention makes it possible to prevent the security established in the original data from being destroyed in bitmap data, while converting the data of a specified file format, in which a security function is set up, in order to obtain the bitmap data.

According to another aspect of the invention, there is provided an image processing method, comprising the steps of: 1) detecting information that indicates a limitation on an operation related to data of a specified file format from the data of the specified file format; 2) converting the data of the specified file format into bitmap data; and 3) setting up an operation limitation related to said bitmap data for said bitmap data in accordance with said information.

According to still another aspect of the invention, there is provided an image processing program that causes a computer to execute a process comprising the steps of: 1) detecting information that indicates a limitation on an operation related to data of a specified file format from the data of the specified file format; 2) converting the data of the specified file format into bitmap data; and 3) setting up an operation limitation related to said bitmap data for said bitmap data in accordance with said information.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 7 shows an example of information to be added to a PDF file when a security function is set up using an electronic signature function.

FIG. 8 shows an example of bitmap data information table.

FIG. 9 shows an example of information to be added to a PDF file when a security function is set up using a document security method.

DETAILED DESCRIPTION OF THE PREFERRED EMBODIMENTS

The embodiments of this invention will be described below with reference to the accompanying drawings.

Figure 1:
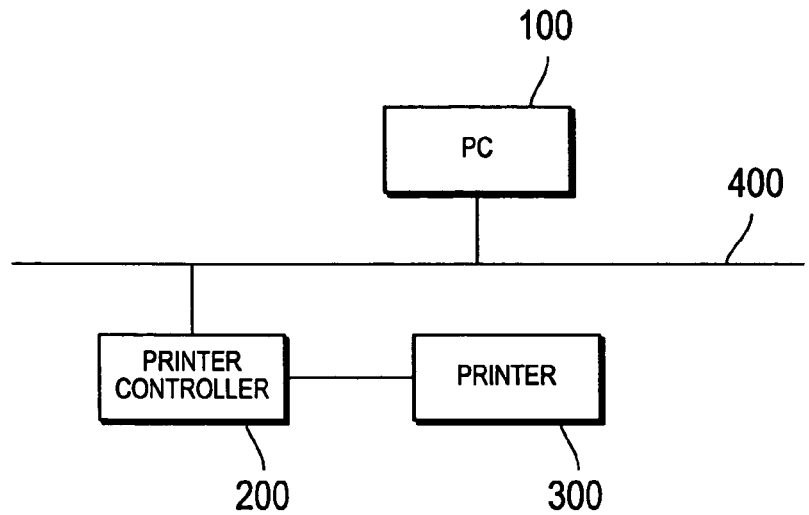
FIG. 1 is a block diagram showing the overall constitution of a printing system.

FIG. 1 is a block diagram showing the overall constitution of a printing system. The printing system shown in FIG. 1 is equipped with a PC (personal computer) 100, a printer controller 200 as an image processing device, and a printer 300. The PC 100 and the printer controller 200 are communicably connected via a network 400, while the printer controller 200 and the printer 300 are communicably connected directly between them.

Alternatively, the printer controller 200 and the printer 300 can be connected via the network 400 instead of directly between them, while the PC 100 and the printer controller 200 can be connected directly between them instead of via the network 400. Moreover, the types and the number of equipment to be connected to network 400 are not limited to those shown in FIG. 1.

Figure 2:
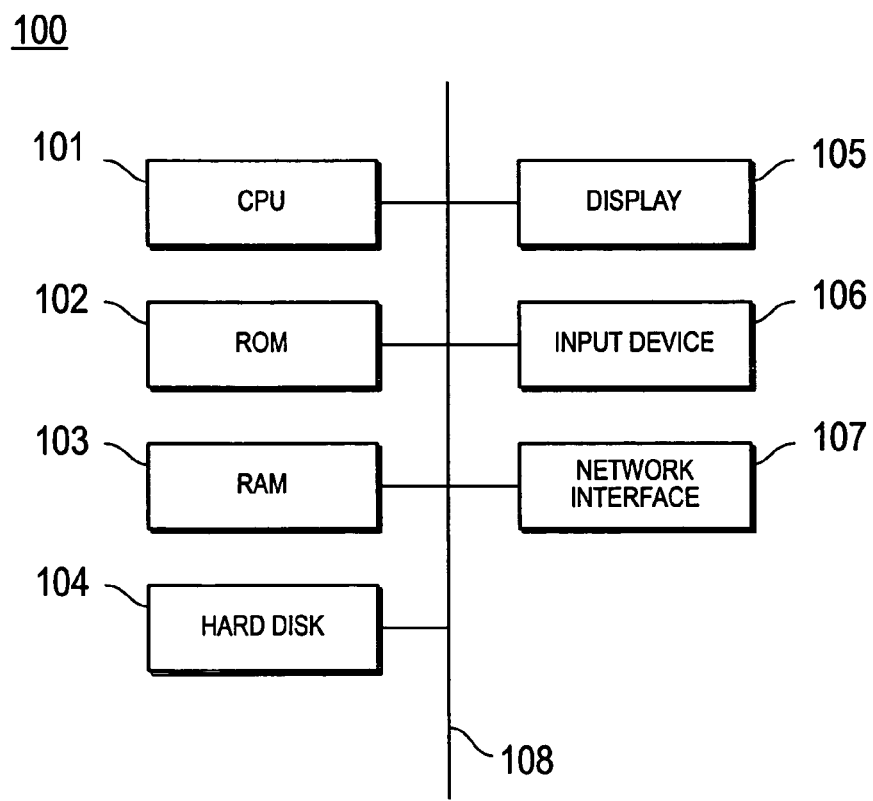
FIG. 2 is a block diagram showing the constitution of a PC.

FIG. 2 is a block diagram showing the constitution of the PC 100. As shown in FIG. 2, the PC 100 contains a CPU 101, a ROM 102, a RAM 103, a hard disk 104, a display 105, an input device 106, and a network interface 107, all of which are interconnected via a bus 108 for exchanging signals.

The CPU 101 controls various parts indicated above and executes various arithmetic processes according to a program. The ROM 102 stores various programs and data. The RAM 103 stores programs and data temporarily as a working area. The hard disk 104 stores various programs including an operating system and data.

Installed on the hard disk 104 are an application for preparing and editing documents, a printer driver for converting the document file specified by the application into language that the printer controller 200 can understand (PDL (Page Description Language) such as PostScript®), and a Web browser used for performing operations such as viewing of the status of the printer controller 200 as well as viewing, printing, and modifying of the image data (bitmap data) saved in the printer controller 200.

Display 105 displays various kinds of information. Input device 106 consists of a pointing device such as a mouse, a keyboard, and others, and is used for making various kinds of inputs.

The network interface 107 is an interface for communicating with other devices via the network 400 using standards such as Ethernet®, Token Ring, FDDI, etc.

Figure 3:
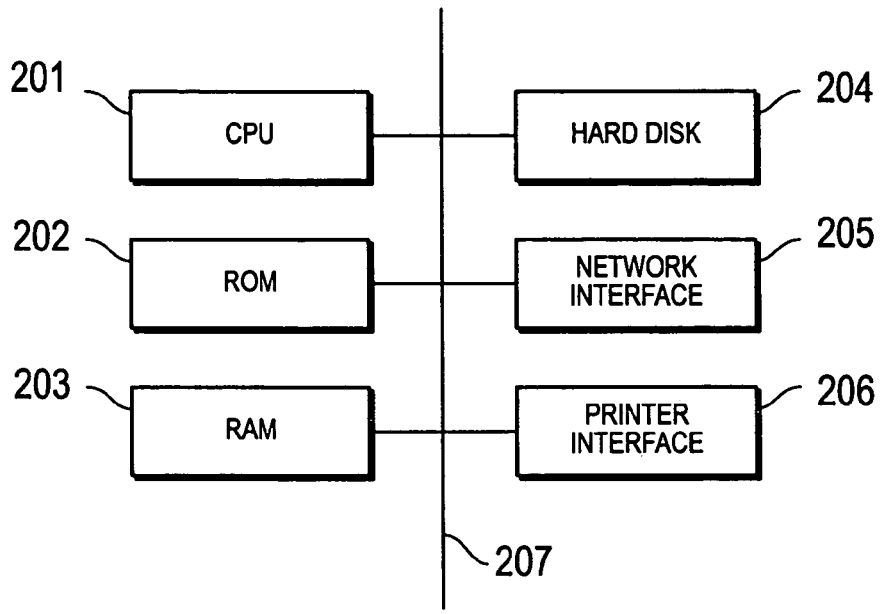
FIG. 3 is a block diagram showing the constitution of a printer controller.

FIG. 3 is a block diagram showing the constitution of the printer controller 200. As shown in FIG. 3, the printer controller 200 contains a CPU 201, a ROM 202, a RAM 203, a hard disk 204, a network interface 205, and a printer interface 206, all of which are interconnected via a bus 207 for exchanging signals. The descriptions of those parts of the printer controller 200 that have the same functions as those of the corresponding parts of the PC 100 will be omitted here to avoid being duplicative.

The hard disk 204 is used for saving the bitmap data supplied to the printer 300 to be printed. Installed on the hard disk 204 is a utility for realizing various operations concerning bitmap data.

The printer interface 206 is an interface for communicating with the printer 300 and a dedicated video interface can be used for it. The printer interface 206 can be either a serial interface such as RS-232C, IEEE 1394, and USB, or a parallel interface such as IEEE 1284, or of a proprietary standard.

Figure 4:
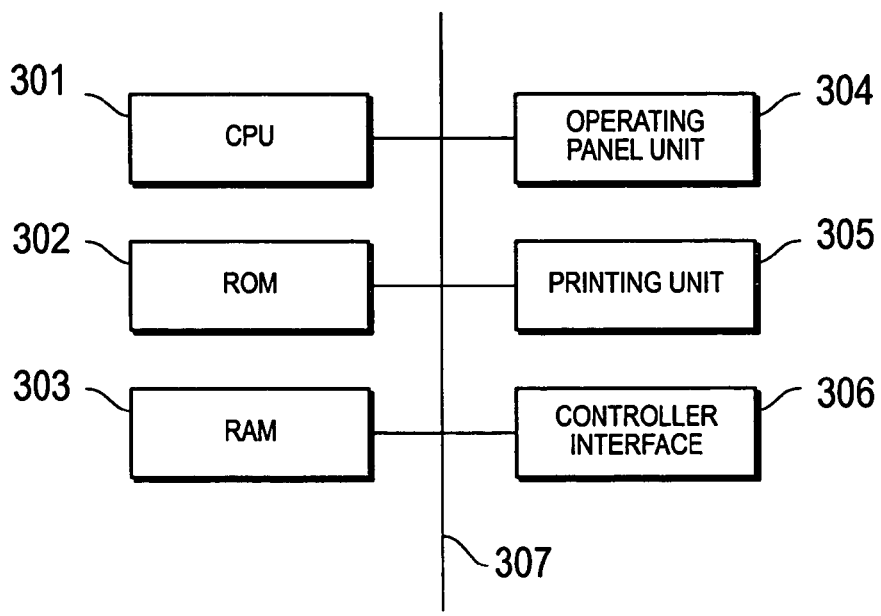
FIG. 4 is a block diagram showing the constitution of a printer.

FIG. 4 is a block diagram showing the constitution of the printer 300. As shown in FIG. 4, the printer 300 contains a CPU 301, a ROM 302, a RAM 303, an operating panel unit 304, a printing unit 305, and a controller interface 306, all of which are interconnected by a bus 307 for exchanging signals. The descriptions of those parts of the printer 300 that have the same functions as those of the corresponding parts of the PC 100 will be omitted here to avoid being duplicative.

The operating panel unit 304 consists of a touch panel, fixed keys, indicator lamps and others provided outside of the touch panel, and is used for various inputting and displaying purposes. The printing unit 305 prints the bitmap data transferred from the printer controller 200 on a recording element such as paper by a printing method such as the electronic photograph method. The, controller interface 306 is an interface for communicating with the printer controller 200.

The PC 100, the printer controller 200, and the printer 300 can each contain constitutional elements other than those described above, or may lack a portion of the abovementioned elements.

The operation of the printing system will be described in the following.

In a printing system according to this embodiment, two types of printing, i.e., the normal printing and the direct printing, are executable. If the normal printing is in process, a file to be printed is first converted into print data described in a PDL by the printer driver in the PC 100 and then is transmitted to the printer controller 200. On the other hand, if the direct printing is in process, the file to be printed is transmitted directly from the PC 100 to the printer controller 200 without being converted into PDL data by the printer driver in the PC 100.

In case of the direct printing, the transmittable file format is limited to the file format that can be converted into bitmap data at the printer controller 200. The direct printing supports various file formats such as PDF (Portable Document Format), TIFF (Tagged Image File Format), PostScript®, and EPS (Encapsulated PostScript®).

In the following description of the present embodiment, the PDF file will be used as an example of the data where the security function can be set up, describing how the direct printing of the PDF file is executed.

Figure 5:
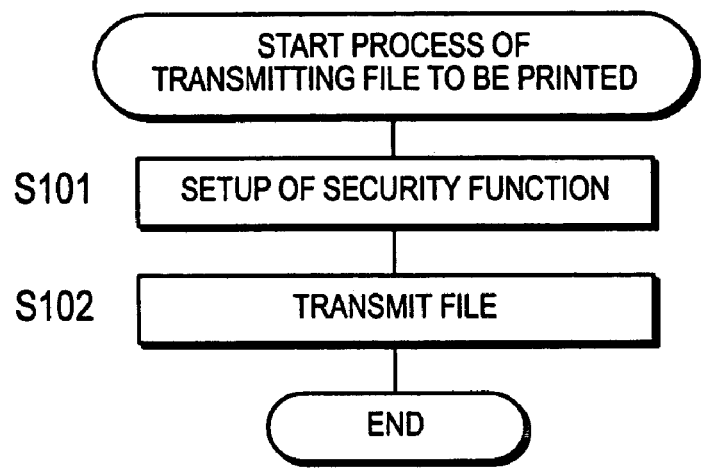
FIG. 5 is a flowchart showing the process procedure in the PC for transmitting a file to be printed.

FIG. 5 is a flowchart showing the process procedure in the PC 100 for transmitting a file to be printed. The algorithm shown in the flowchart of FIG. 5 is stored as a program in a storage unit such as the hard disk 104 of PC 100 and executed by the CPU 101.

First, it is assumed as a premise that the data to be printed is already entered by the application into the PDF file data that constitutes the PDF file. Next, the security function is set up in the PDF file based on the user's operation (S101). The operation limiting information that shows the limitation to the operation concerning the PDF file is added here to the PDF file.

The security function setting includes a case where the operation limitation related to a PDF file is set up while the PDF file is approved by signing it, and a case where the operation limitation related to a PDF file is set up using a security method of the document.

The electronic signature function is used in a PDF file in order to prove the identity of the author. A digital ID can be used as a signature. Either the author's name or the approver's name can be used as a signatory's name. The log-in name used in a utility for conducting the operation related to the bitmap data is used as the signatory's name in the present embodiment. However, it is possible to use a host name or a log-in name for the PC 100 as the signatory's name The prepared PDF file is then transmitted to the printer controller 200 (S102). More specifically, the prepared file is transferred to an open folder (or open queue) established in a storage unit such as the RAM 203 in the printer controller 200. Various transfer methods can be used in this case such as data transfer by means of SMB (Server Message Block) communication via the network 400, data transfer by means of FTP (File Transfer Protocol) communication via the network 400, data transfer using a recording medium such as a CD (Compact Disc) or MO (Magneto Optical Disk), and data transfer as an attachment to an electronic mail message.

Figure 6:
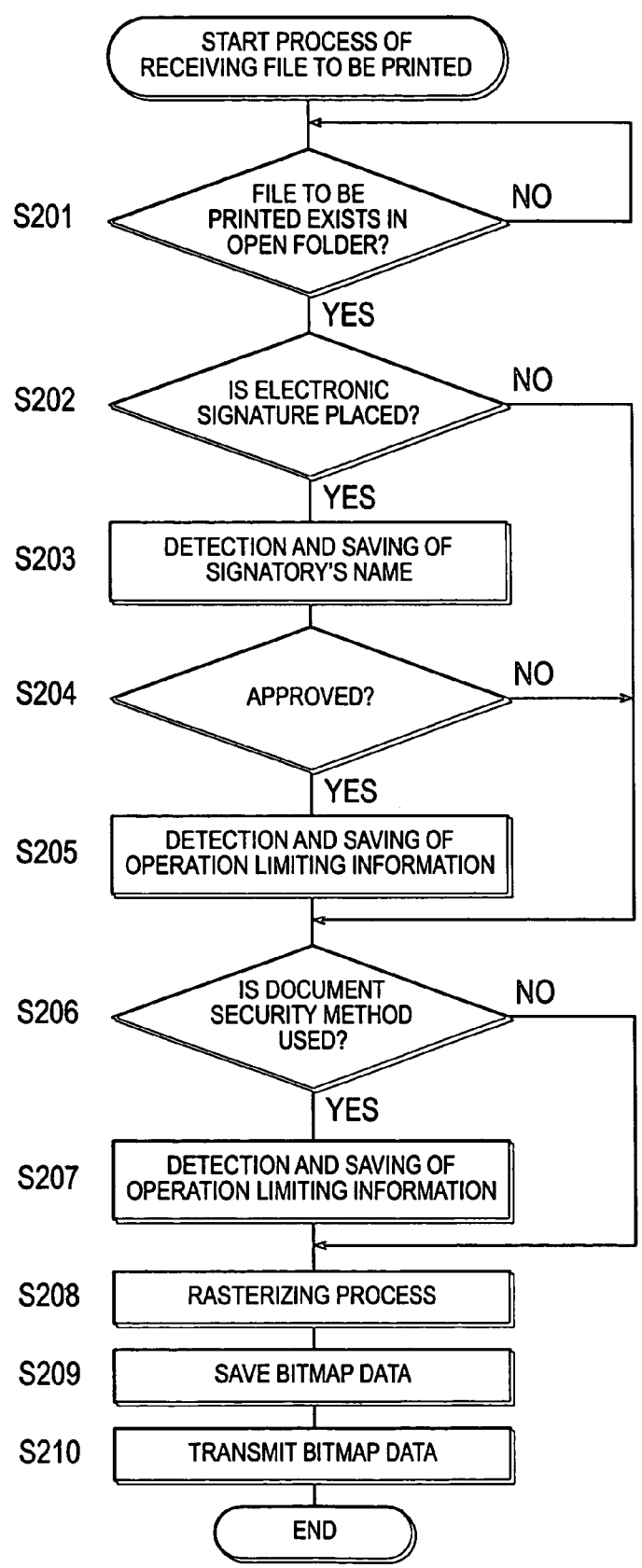
FIG. 6 is a flowchart showing the process procedure in the printer controller for receiving a file to be printed.

FIG. 6 is a flowchart showing the process procedure in the printer controller 200 for receiving a file to be printed. The algorithm shown in the flowchart of FIG. 6 is stored as a program in a storage unit such as the hard disk 204 of the printer controller 200 and executed by the CPU 201.

First, the printer controller 200 makes a judgment as to whether the PDF file to be printed exists in the open folder or not. In other words, a confirmation is performed regularly as to whether the PDF file to be printed, which is received from the PC 100 for example, exists in the open folder or not. If the PDF file does not exist in the open folder (S201: No), it stands by until the PDF file is reserved anew in the open folder.

If it is judged that the PDF file exists in the open folder (S201: Yes), a judgment is made as to whether an electronic signature is placed on said PDF file or not (S202). If no electronic signature is placed (S202: No), the process advances to step S206.

FIG. 7 shows an example of information to be added to a PDF file when a security function is set up using an electronic signature function. If "/Type/Sig/Name" is detected in the PDF file, it is judged that an electronic signature is placed on the PDF file.

If an electronic signature is placed on the PDF file (S202: Yes), the detection and the saving of the signatory's name are performed (S203). In case of FIG. 7, the portion included in the parenthesis ("testname" in the present case) following the "/Type/Sig/Name" denotes the signatory's name. The detected signatory's name will be saved together with the file name in a storage unit such as the hard disk 204 in the printer controller 200. The signatory's name is saved associated with the file name in the bitmap data information table.

FIG. 8 shows an example of bitmap data information table. In FIG. 8, the "Job No." column shows the identification number arbitrarily assigned to the newly received file. The "File Name" column shows the file name of the received file. The "Status" column shows the status of the job related to the received file (indicating that the "Printed" has been printed). The "Job Class" column shows the types of a job, e.g., print, scan, etc. The "Owner" column shows the operator of the job (it shows the name of the signatory recorded in the electronic signature area if an electronic signature is placed on the received file). The value of the "Date" column denotes the date the particular job is completed. The table can include other columns such as a column indicating the data size.

Next, a judgment is made as to whether the document related to the PDF file to be printed is approved or not (S204). If the document is not approved (S204: No), the process advances to step S206.

As shown in FIG. 7, it is judged that the document related to the PDF file is approved when "TranformParams<</Type/TransformParams/P(number)" is detected in the PDF file.

When the document is approved (S204: Yes), the detection and saving of the operation limiting information are performed (S205). In case of FIG. 7, the numeral following the "Type/TransformParams/P" denotes the operation limiting level. Here, "P1" denotes that the document modification is not approved, "P2" approves only the form field to be entered, and "P3" approves only annotations to be generated and the form field to be entered. The annotation is the additional information for the file, and the form field is the area for entering values.

The operation limitation related to the bitmap data obtained by rasterizing the received PDF file can be set up in accordance with the abovementioned numeral that follows "P." In other words, the operation limitation related to the bitmap data is set up on the bitmap data information table in accordance with the detected operation limiting information.

For example, if "P1" is detected as operation limiting information from the received PDF file, the operation limitation related to the bitmap data that no modification of the bitmap data is allowed is set up. In this case, as shown in FIG. 8, the value of the "Edit" column on the bitmap data information table is set to "No" associated with the file name and saved. In other words, the "Edit" column denotes whether the editing of the bitmap data is allowed or not in FIG. 8. Also, if "P2" or "P3" is detected, the operation limitation related to the bitmap data is set up, allowing only the information to be added to the image data, such as the header, footer, date and number, to be edited. In this case, as shown in FIG. 8, the value of the "Header" column on the bitmap data information table is set to "Yes" associated with the file name and saved. In other words, in FIG. 8, the "Header" column denotes whether it is allowed to edit any areas other than the image data or not. Moreover, only "P1" can be used as the operation limiting information.

In the step S206, a judgment is made as to whether a document security method is used or not. If a document security method is not used (S206: No), the process advances to step S208.

FIG. 9 shows an example of information to be added to a PDF file when a security function is set up using a document security method. If "/R (numeral)" is detected in the PDF file, it is judged that a document security method is used on the PDF file. The numeral following "/R" denotes a revision of security. FIG. 9 shows an example where a security method by means of a password is used, but it can be replaced with a security method by means of a digital ID.

When a document security method is used (S206: Yes), the detection and saving of the operation limiting information are performed (S207). In FIG. 9, the numeral following "/P-" denotes the contents of the security. This value is an unsigned integer expressed in a decimal number and is converted into a binary number. For example, a decimal "2364" shown in FIG. 9 is converted into a 32 bit binary number "11111111111111111011011011000100." The operation limiting information can be detected based on the value of each bit of the numeral of the binary number obtained by the conversion.

If BIT3, i.e., the third bit value of the numerical value of a binary number is "1," printing is allowed; however, if BIT3 is "0," printing is not allowed. If BIT12, i.e., the 12$^{th}$ bit value is "1," printing at a high resolution level is allowed; however, if BIT12 is "0," printing only at a low resolution (150 dpi) is allowed. If BIT4, i.e., the fourth bit value is "1," document modification is allowed; however, if BIT4 is "0," document modification is not allowed. If BIT6, i.e., the sixth bit value is "1," generations and editions of annotations and the form field are allowed; however, if BIT6 is "0," generations and editions of annotations and the form field are not allowed. If BIT9, i.e., the ninth bit value is "1," input to the form field and signature are allowed; however, if BIT9 is "0," input to the form field and signature are not allowed. If BIT11, i.e., the 11th bit value is "1," editing and usage of a document assembly are allowed; however, if BIT11 is "0," editing and usage of a document assembly are not allowed. Editing and usage of a document assembly includes insertion, rotation and deleting of a page as well as generation of a bookmark and thumbnail image.

The operation limitation related to the bitmap data obtained by rasterizing the received PDF file can be set up in accordance with the abovementioned numeral that follows. "/P-." In other words, the operation limitation related to the bitmap data is set up in accordance with the detected operation limiting information.

For example, if the BIT3 is detected to be "0," the operation limitation related to bitmap data that printing of the bitmap data is not allowed is set up. Consequently, it becomes possible to reject the reprinting of bitmap data using the document security method. In this case, as shown in FIG. 8, the value of the "Print" column on the bitmap data information table is set to "No" associated with the file name and saved. In other words, the "Print" column of the bitmap data information table shown in FIG. 8 indicates whether the printing of the bitmap data is allowed or not.

Also, if the BIT4 is detected to be "0," the operation limitation related to bitmap data that no modification of the bitmap data is allowed at all is set up. In this case, as shown in FIG. 8, the value of the "Edit" column on the bitmap data information table is set to "No" associated with the file name and saved. Also, if BIT6, BIT9 or BIT11 is detected to be "1," the operation limitation related to the bitmap data is set up, allowing only the information to be added to the image data, such as the header, footer, date and number, to be edited. In this case, as shown in FIG. 8, the value of the "Header" column on the bitmap data information table is set to "Yes" associated with the file name and saved.

In the step S208, rasterizing process is applied to the received PDF file. In other words, bitmap data is obtained by converting the PDF file.

The bitmap data thus obtained is saved in a storage unit such as the hard disk 204 in the printer controller 200 associated with the file name registered on the bitmap data information table. In other words, the operation limitation related to the particular bitmap data is consequently set up for the bitmap data in accordance with the detected operation limiting information. However, the method of associating bitmap data with the contents of the operation limitation related to the particular bitmap data is not limited to the method of using the bitmap data information table.

Next, the printer controller 200 transmits the bitmap data obtained in the step S208 to the printer 300.

Figure 10:
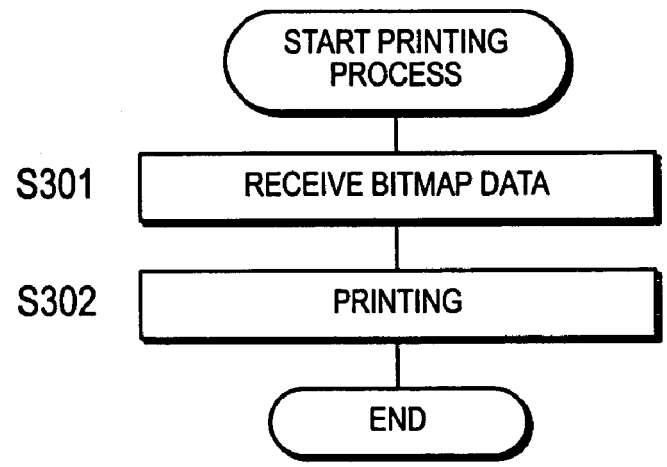
FIG. 10 is a flowchart showing the printing process procedure in the printer.

FIG. 10 is a flowchart showing the printing process procedure in the printer 300. The algorithm shown in the flowcharts of FIG. 10 is stored as a program in a storage unit such as a ROM 302 of printer 300 and executed by CPU 301.

First, the printer 300 receives bitmap data from the printer controller 200 (S301). The received bitmap data is printed by the printing unit 305 on a recording medium such as paper (S302).

Next, let us describe the procedure of reusing bitmap data saved as processed data in the printer controller 200.

Figure 11:
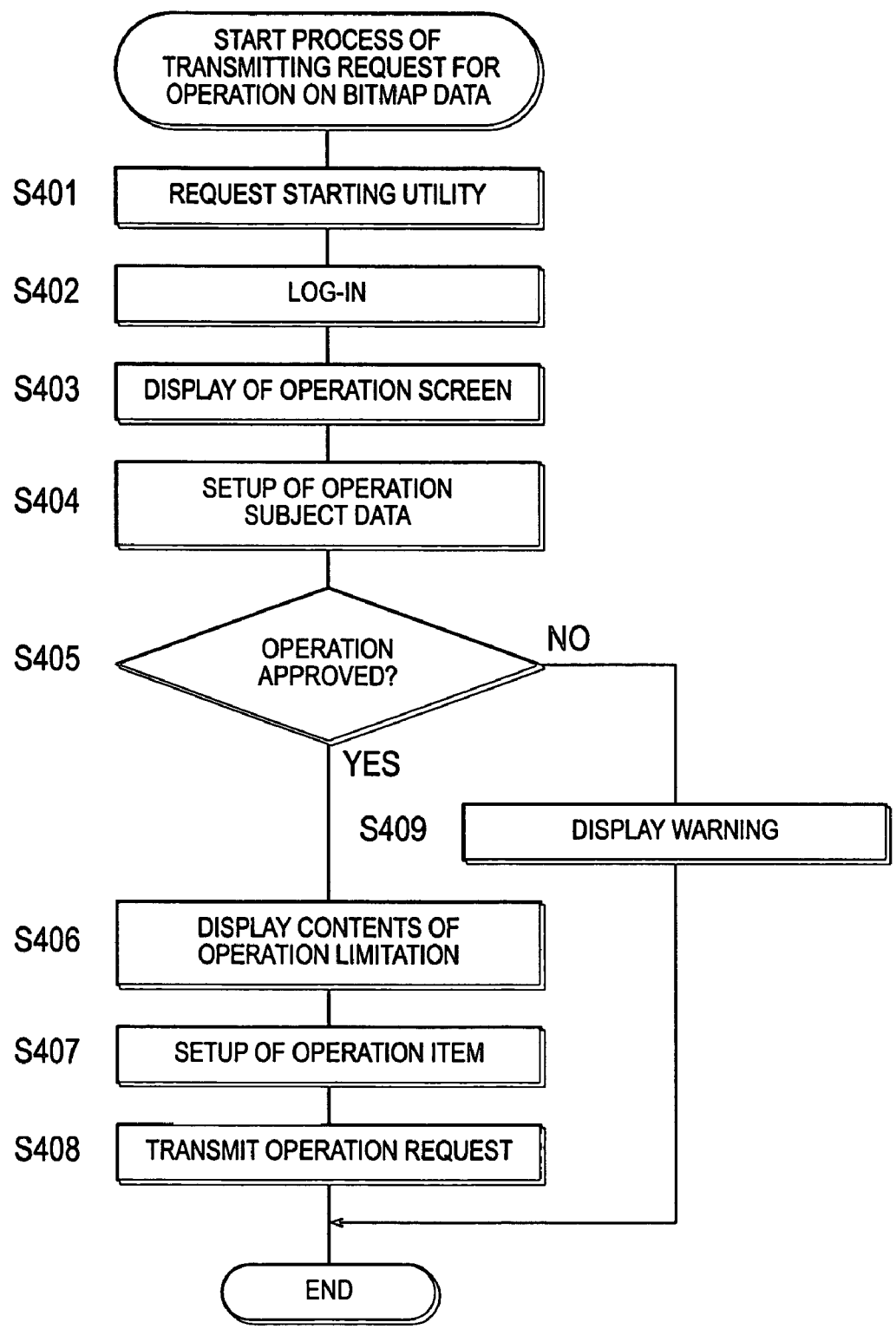
FIG. 11 is a flowchart showing the process procedure in the PC for transmitting a request for an operation on bitmap data.

FIG. 11 is a flowchart showing the process procedure in the PC 100 for transmitting a request for an operation on bitmap data. The algorithm shown in the flowchart of FIG. 11 is stored as a program in a storage unit such as a hard disk 104 of PC 100 and executed by CPU 101.

First, the PC 100 communicates with the printer controller 200 using the Web browser, and request the startup of the utility for operating the bitmap data saved in the printer controller 200 (S401).

Next, based on the user's input, the log-in process is executed in order to obtain the approval for accessing after the utility is started up (S402). At this point, the log-in certification process is performed by the printer controller 200 in accordance with the log-in name and the password entered.

Figure 12:
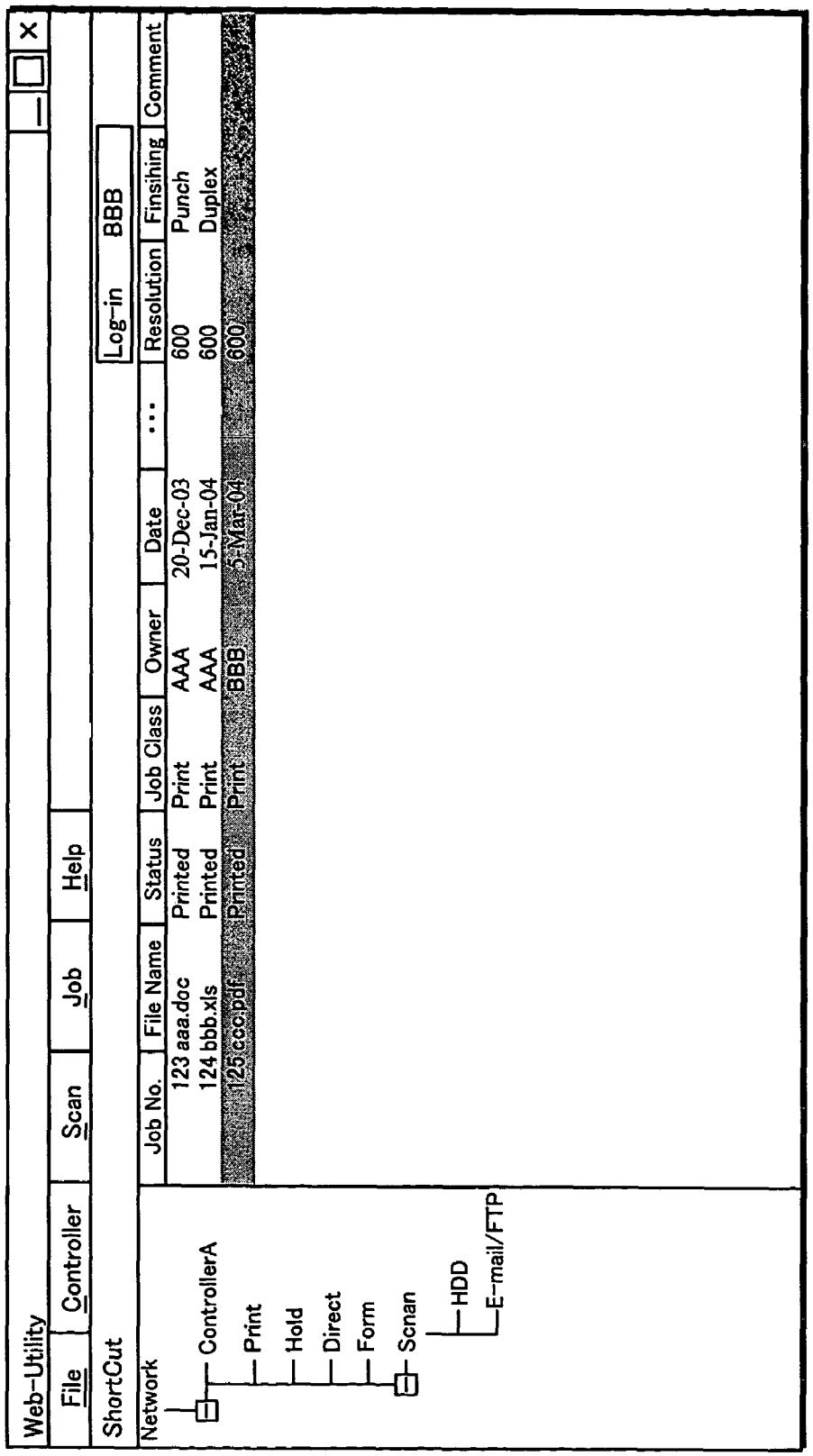
FIG. 12 is a diagram showing an example of an operating screen.

When the log-in process is completed, the operation screen for receiving the operation related to the bitmap data will appear on the display 105 (S403). FIG. 12 is a diagram showing an example of the operating screen. A job list will be displayed on the operating screen shown in FIG. 12.

As a file (bitmap data) desired to be operated is selected among the list displayed, the operation subject data will be set up (S404). The PC 100 transmits the information concerning the setup of the operation subject data to the printer controller 200, and the printer controller 200 returns to the PC 100 a notice indicating whether the operation is approved or not.

In the step S405, a judgment is made as to whether the operation is approved or not. In other words, a judgment is made as to whether the contents of the operation limitation or the warning notices are received from the printer controller 200.

If the operation is approved (S405: Yes), the contents of the operation limitation related to the bitmap data will be displayed (S406). According to the contents received from the printer controller 200, a portion of the operating function in the operating screen, which is to be limited, is grayed out, thus limiting a portion or all of the operations.

Then, a desired operation item is set up among the usable operations through the operating screen based on the user's selection (S407).

Next, an operation request such as a printing request, is transmitted to the printer controller 200 according to the specified operation item.

On the other hand, if a warning notice is received without an approval of the operation (S405: No), a specified warning will appear on the display 105 (S409). In this case, a warning indicating that the operation can not be executed due to the lack of authority is displayed, warning the user.

Figure 13:
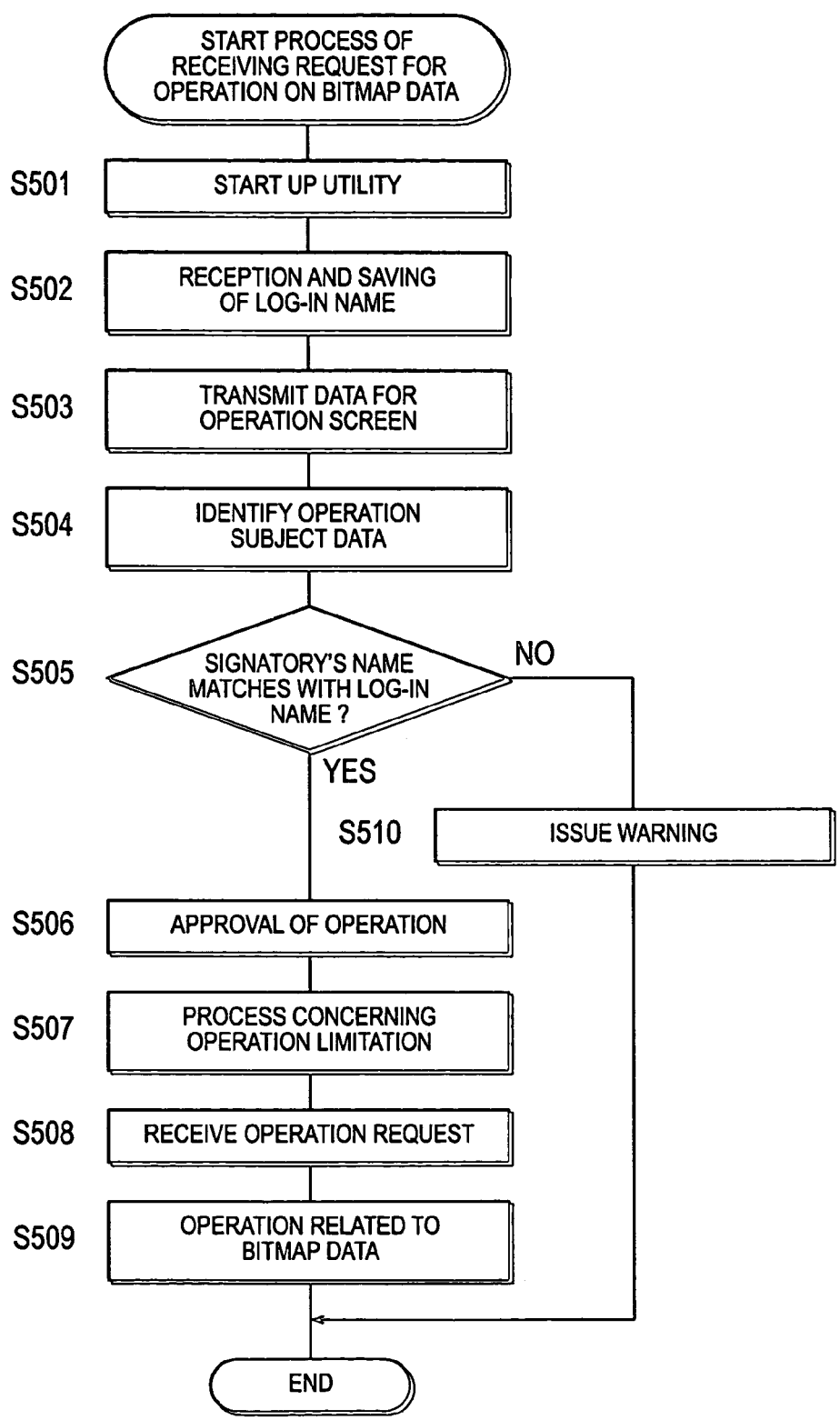
FIG. 13 is a flowchart showing the process procedure in the printer controller for receiving a request for an operation on bitmap data.

FIG. 13 is a flowchart showing the process procedure in the printer controller 200 for receiving a request for an operation on bitmap data. The algorithm shown in the flowchart of FIG. 13 is stored as a program in a storage unit such as the hard disk 204 of the printer controller 200 and executed by the CPU 201.

First, the printer controller 200 starts up the utility for operating the bitmap data based on a request from the PC 100 (S501).

Next, the log-in certification process is performed in accordance with the log-in name and the password received from the PC 100, and the log-in name is saved in a storage unit such as the RAM 203(S502).

Next, the data for the operating screen is transmitted to the PC 100 (S503). The bitmap data to be operated is then specified in accordance with the information concerning the setup of the operation subject data received from the PC 100 (S504).

A judgment is made in the step S505 as to whether the signatory's name of the specified bitmap data matches with the log-in name for the specified utility or not. The signatory's name is described in the "Owner" column in the bitmap data information table shown in FIG. 8.

If the signatory's name matches with the log-in name (S505: Yes), the operation related to the bitmap of the specified operation subject will be approved (S506). Next, the process concerning the operation limitation is performed (S507). At this point, an instruction for graying out the portion of the operating function in the operating screen, which is to be limited, is transmitted to the PC 100 in accordance with the contents of the bitmap data information table.

More specifically, when the operation is approved, it becomes basically possible to do various operations including viewing in the preview mode, editing, deleting, reprinting, transferring by an electronic mail and the like, and obtaining data related to the bitmap data saved in the printer controller 200. However, the usable operations do not exceed the range that is not constricted by the operation limitation related to the bitmap data, which is set up in accordance with the operation limitation information of the original PDF file. For example, if an electronic signature is placed on the original PDF file and is authorized and the operation limitation information is "P1," which means that no modification of the document is allowed, it is possible to view and reprint the document but no operation such as adding of a header, which amounts to a modification, is allowed. This limits the usable operation content related to the bitmap data.

Next, an operation request such as a printing request is received from the PC 100 (S508). The operation related to the specified bitmap data is then performed in accordance with the type of the operation request (S509). If the operation request happens to be a printing request, said bitmap data is transmitted to the printer 300 and printed.

If, on the other hand it is judged in the step S505 that the signatory's name does not match with the log-in name (S505: No), a warning is issued to the PC 100 (S510). In this case, a warning indicating that the operation can not be executed due to the lack of authority is transmitted to the PC 100. This limits the user who is authorized to operate related to the bitmap data.

Thus, according to this embodiment, the printer controller 200 detects the information that indicates a limitation on an operation related to a PDF file from said file, and converts the PDF file into bitmap data. Furthermore, the printer controller 200 sets up the operation limitation related to the bitmap data for the obtained bitmap data in accordance with the detected information.

Therefore, it is made possible to securely prevent the security established in the original data from being destroyed in the bitmap data, while converting the data of a PDF file, in which a security function is set up, in order to obtain bitmap data.

It is obvious that this invention is not limited to the particular embodiments shown and described above but may be variously changed and modified without departing from the technical concept of this invention.

For example, although the printer controller 200 is provided as an image processing device separate from the printer 300, the present invention is not limited to it. The printer controller 200 can be included in the printer 300. Therefore, the present invention is applicable to printing devices such as a copying machine, an MFP (Multi-Function Peripheral), etc.

Moreover, although a case of obtaining bitmap data by converting a PDF file was described in the above embodiment, the present invention is not limited to it. The present invention is also applicable to a case of obtaining bitmap data by converting data of other file formats to which security functions can be set up.

Furthermore, the operation limiting information detected from a file is not limited to information exemplified by the above embodiment. The operation limiting information to which the invention is applicable can be any arbitrary information as long as it is related to a limitation of an operation concerning data. Moreover, the limitation of operations related to bitmap data set up in accordance with the operation limiting information of the original file is not limited to the operation limitation exemplified by the embodiment described above. The operation limitation related to the bitmap data can be arbitrarily set up in such a way as to have a corresponding relation with the operation limiting information of the original file.

The means and method of conducting various processes in the printer controller as an image processing device according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the image processing device as a part of its function.

What is claimed is:

1. An image processing device, comprising:
   a detection unit for detecting, from data in a specified file format, information that indicates a limitation on an operation to the data in the specified file format;
   a converting unit for converting the data in the specified file format into bitmap data;
   a setup unit for setting up the limitation on an operation in said bitmap data, wherein the limitation on an operation indicated by the information from the data in the specified file format is the limitation on an operation in said bitmap data; and
   a storage unit for storing said bitmap data that includes the limitation on an operation.

2. An image processing device as claimed in claim 1, wherein said data in the specified file format is data described in page description language.

3. An image processing device as claimed in claim 2, wherein said data in the specified file format is PDF data.

4. An image processing device as claimed in claim 3, wherein said information contains information indicating a limitation on the printing of the data in the specified file format.

5. An image processing device as claimed in claim 3, wherein said information contains information indicating a limitation on the modification of the data in the specified file format.

6. An image processing device as claimed in claim 3, further comprising a judgment unit for judging, when a request for an operation related to said bitmap data is received, whether the requested operation should be approved or not in accordance with the limitation on an operation set up in said bitmap data.

7. An image processing device as claimed in claim 2, wherein said information contains information indicating a limitation on the printing of the data in the specified file format.

8. An image processing device as claimed in claim 2, wherein said information contains information indicating a limitation on the modification of the data in the specified file format.

9. An image processing device as claimed in claim 2, further comprising a judgment unit for judging, when a request for an operation related to said bitmap data is received, whether the requested operation should be approved or not in accordance with the limitation on an operation set up in said bitmap data.

10. An image processing device as claimed in claim 1, wherein said information contains information indicating a limitation on the printing of the data in the specified file format.

11. An image processing device as claimed in claim 1, wherein said information contains information indicating a limitation on the modification of the data in the specified file format.

12. An image processing device as claimed in claim 1, further comprising a judgment unit for judging, when a request for an operation related to said bitmap data is received, whether the requested operation should be approved or not in accordance with the limitation on an operation set up in said bitmap data.

13. An image processing device as claimed in claim 1, wherein the limitation on an operation limits operations including at least one of editing, deleting, reprinting and transferring.

14. An image processing method, comprising:

- detecting, from data in a specified file format, information that indicates a limitation on an operation to the data in the specified file format;
- converting the data in the specified file format into bitmap data;
- setting up the limitation on an operation in said bitmap data, wherein the limitation on an operation indicated by the information from the data in the specified file format is the limitation on an operation in said bitmap data; and
- storing said bitmap data that includes the limitation on an operation in a storage unit.

15. An image processing method as claimed in claim 14, wherein said data in the specified file format is data described in page description language.

16. An image processing method as claimed in claim 15, wherein said data in the specified file format is PDF data.

17. An image processing method as claimed in claim 14, wherein the limitation on an operation limits operations including at least one of editing, deleting, reprinting and transferring.

18. An image processing program encoded on a computer readable recording medium that causes a computer to execute a process comprising:

- detecting, from data of a specified file format, information that indicates a limitation on an operation to the data of the specified file format;
- converting the data in the specified file format into bitmap data;
- setting up the limitation on an operation in said bitmap data, wherein the limitation on an operation indicated by the information from the data in the specified file format is the limitation on an operation in said bitmap data; and
- storing said bitmap data that includes the limitation on an operation in a storage unit.

19. An image processing program as claimed in claim 18, wherein the limitation on an operation limits operations including at least one of editing, deleting, reprinting and transferring.

* * * * *